Patented Oct. 10, 1950

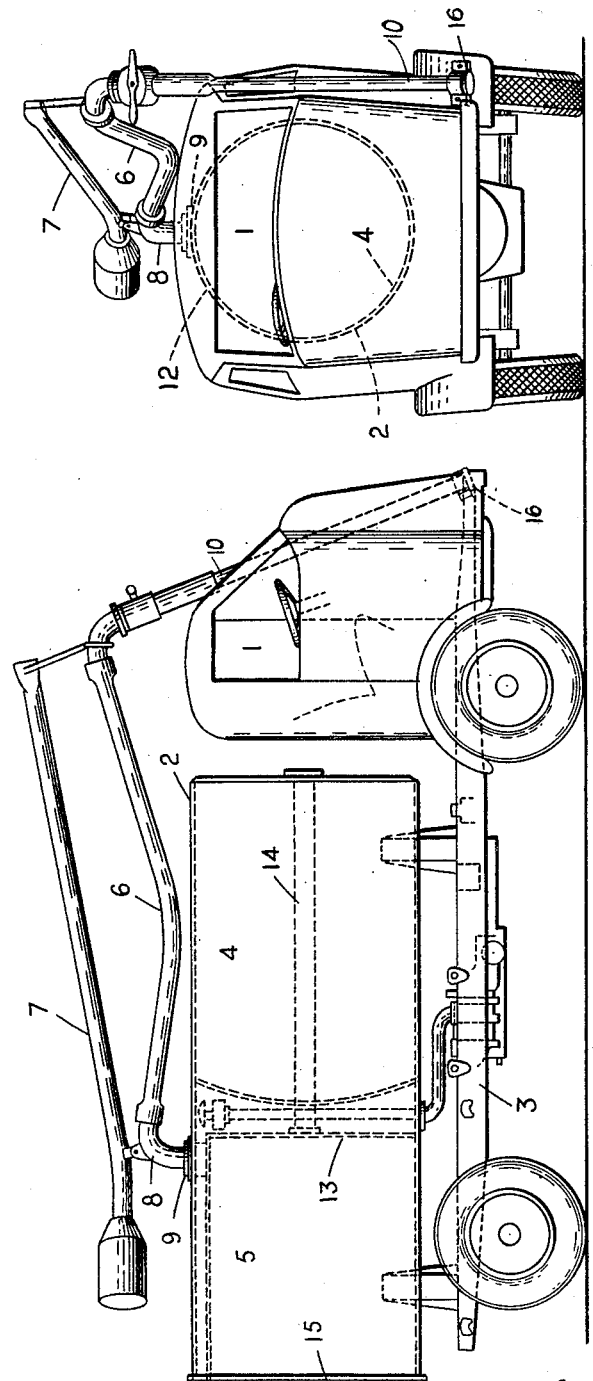

2,525,372

UNITED STATES PATENT OFFICE 2,525,372

GULLEY EMPTYING APPARATUS INCORPORATING A VACUUM CHAMBER

Leonard H. Riddell, Leeds, England

Application February 24, 1948, Serial No. 10,515
In Great Britain October 24, 1944

Section 1, Public Law 690, August 8, 1946
Patent expires October 24, 1964

1 Claim. (Cl. 214—83.28)

This invention relates to gulley emptying apparatus of the kind usually mounted upon a vehicle chassis and wherein sludge from gullies and cesspools is drawn into a sludge tank by means of a vacuum through a sludge pipe suspended from over the vehicle and having a suction pipe which is lowered by the operator into the gulley or cesspool.

With the present method of mounting and suspending sludge or suction pipes it is necessary for the operator to work at the side or rear of the vehicle with the result that proper co-operation between the operator and the driver is difficult.

The chief object of the present invention is to provide a new or improved method of mounting the suction pipe relative to the vehicle which will enable the operator and the driver to work the apparatus and the vehicle together at the front thereof and thus ensure proper co-operation between them.

According to the invention the sludge or suction pipe is suspended from the top of the vehicle at a point on the tank from where the pipe can be carried forward to the front of the vehicle and is capable of being swung from one side to the other thereof and lowered into the gulley or cesspool alongside the driver's cab in direct view of the driver and thus ensuring proper co-operation between the driver and the operator. The weighted crane or lever carrying the sludge or suction pipe will be pivotally connected to the pipe bend which is mounted on the tank where the sludge is passed into the sludge tank. Preferably the sludge pipe will be carried on the tank and enter therein at a point behind the centre of the top of the tank in cases where the forward half of the tank constitutes a liquid container and the rear half of the tank constitutes the sludge tank.

In order that the invention may be readily understood and carried into effect the same will now be more fully described with reference to and by the aid of the accompanying drawings, wherein—

Figure 1 is a side elevation of a motor wagon gulley emptying apparatus showing the mounting and suspending means for the sludge pipe constructed according to the invention, and Figure 2 is an end view of Figure 1.

Referring to the drawings, 1 represents the driver's cab of the motor wagon, 2 a tank mounted upon the vehicle chassis 3. In the type of apparatus shown the forward half 4 of the tank constitutes a liquid container for clean water or disinfectant for resealing the gullies after being emptied of their contents, and the other half 5 constitutes the sludge tank for receiving the contents of the gullies either directly therefrom or by way of a superposed vacuum chamber.

From the top of the vehicle is suspended a sludge or suction pipe 6, the said pipe being suspended at a point on the tank from where the pipe can be carried forward and lowered into the gulley or cesspool alongside the driver's cab 1.

The sludge or suction pipe is supported or carried on the tank by means of a crane or weighted lever 7 which is pivotally connected to a pipe bend 8 which is mounted on the tank at a point 9 where the sludge is passed into the sludge tank 5.

Preferably the sludge pipe 6 is carried on the tank at a point behind the centre of the top of the tank in the case where the forward half of the tank constitutes a liquid container and the rear half of the tank constitutes the sludge tank. The open end 10 of the pipe which is adapted to enter the gulley or cesspool is supported when not in use in a suitable bracket 16 at the front of the vehicle.

It will be understood that the sludge or suction pipe 6 can be worked from or at either the near side or the off side of the driver as desired by simply turning the pipe 6 with its downwardly extending or open end 10 about the front or rear of the vehicle on its pivotal mounting 12 which is adapted to provide 360° of travel.

It will thus be readily appreciated that by enabling the operator of the sludge or suction pipe to work alongside the driver in the cabin 1 affords proper co-operation between the two when working and also obviates the necessity for a step at the rear or side of the vehicle in former arrangements for the pipe operator in which position he is totally out of touch with the driver.

In the particular type of gulley emptying apparatus as shown with a forward liquid tank and a rear sludge tank, a pusher plate 13 is provided operated by means of a ram 14 to compress the sludge in the tank to remove surplus liquid and also to eject the sludge when required through the rear door 15.

I claim:

A mounting and suspending means for a sludge or suction pipe of a gulley emptying vehicle having a tank mounted thereon comprising a crane, a sludge pipe carried by said crane, a pipe bend pivotally connecting said sludge pipe to the tank, a bracket at the front of said vehicle for supporting the open end of the sludge pipe, the pipe bend and the sludge pipe being capable of complete rotation about the vehicle through 360°.

L. H. RIDDELL.

REFERENCES CITED

The following references are of record in the file of this patent:

UNITED STATES PATENTS

| Number | Name | Date |
| --- | --- | --- |
| Re. 21,277 | Ruemelin | Nov. 21, 1939 |
| 351,783 | Lewis | Nov. 2, 1886 |
| 1,316,851 | Nisbet | Sept. 23, 1919 |
| 1,561,744 | Raymond | Nov. 17, 1925 |
| 2,132,727 | Foote | Oct. 11, 1938 |
| 2,259,966 | Tappe | Oct. 21, 1941 |

FOREIGN PATENTS

| Number | Country | Date |
| --- | --- | --- |
| 259,403 | Great Britain | Oct. 14, 1926 |